United States Patent [19]

Yumura et al.

[11] Patent Number: 5,339,208
[45] Date of Patent: Aug. 16, 1994

[54] ASSEMBLY FOR SUPPORTING A MAGNETIC HEAD TO FLOAT RELATIVE TO A MAGNETIC DISK

[75] Inventors: Takashi Yumura; Kiyoshi Funai; Tetsu Yamamoto, all of Hyogo, Japan

[73] Assignee: Mitsubishi Denki Kabushiki Kaisha, Tokyo, Japan

[21] Appl. No.: 772,212

[22] Filed: Oct. 7, 1991

[30] Foreign Application Priority Data

Oct. 5, 1990 [JP] Japan ................... 2-268807
Mar. 25, 1991 [JP] Japan ................... 3-60348

[51] Int. Cl.$^5$ ............................................. G11B 5/48
[52] U.S. Cl. ................................................. 360/104
[58] Field of Search ................................... 360/104

[56] References Cited

U.S. PATENT DOCUMENTS

| | | | |
|---|---|---|---|
| 4,868,694 | 9/1989 | Hagen | 360/104 |
| 5,027,241 | 6/1991 | Hatch | 360/104 |
| 5,107,383 | 4/1992 | Takeuchi | 360/104 |

FOREIGN PATENT DOCUMENTS

| | | |
|---|---|---|
| 62-65275 | 3/1987 | Japan . |
| 63-225981 | 9/1988 | Japan . |
| 64-70977 | 3/1989 | Japan . |
| 2-46578 | 2/1990 | Japan . |

*Primary Examiner*—A. J. Heinz
*Attorney, Agent, or Firm*—Wolf, Greenfield & Sacks

[57] ABSTRACT

An assembly for supporting a magnetic head to float relative to a magnetic disk, comprises a load arm extending substantially tangentially of a magnetic disk and moved substantially radially of the magnetic disk, the load arm having a proximal end, and a distal end and including a spring portion at its proximal end, a gimbal secured to the distal end of the load arm and including a pivot, the load arm including a contact point at its distal end to contact with the pivot, and a magnetic head slider secured to the gimbal so as to pitch and roll about the pivot with movement of the magnetic disk. The magnetic head slider is adapted to support a magnetic head and is urged toward the magnetic disk under the influence of the spring portion of the load arm. The load arm has a shear center at the contact point.

9 Claims, 15 Drawing Sheets

ASSEMBLY FOR SUPPORTING A MAGNETIC HEAD TO FLOAT RELATIVE TO A MAGNETIC DISK

BACKGROUND OF THE INVENTION

1. Field of the Invention

The present invention relates to an assembly for supporting a magnetic head or a magnetic head slider to float relative to a magnetic disk such as a hard disk and particularly, to an in-line type magnetic head support assembly in which a load beam or arm extends in a direction tangentially of the magnetic disk.

2. Description of the Related Art

Figure 10:
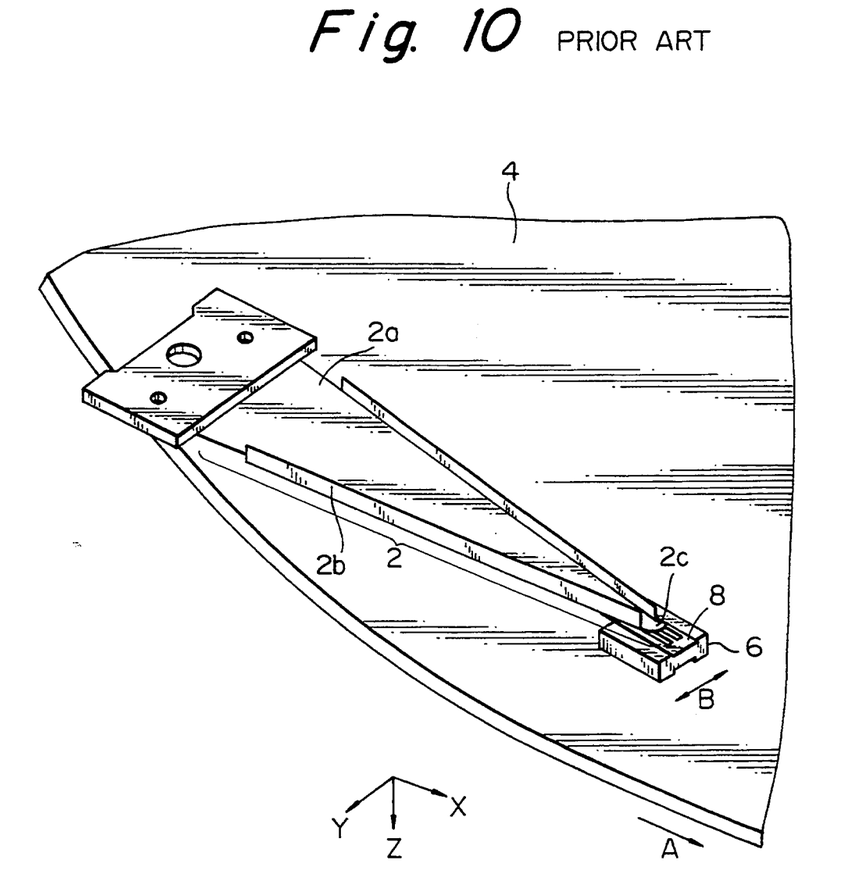
FIG. 10 is a perspective view of a conventional magnetic head support assembly.

In a magnetic disk data storage apparatus, a magnetic head slider is adapted to pitch and roll with dynamic displacement of a magnetic disk so as to accurately read data. A conventional magnetic head support assembly is disclosed, for example, in Japanese laid-open patent publication No. 70977/89. Referring specifically to FIG. 10, the prior art support assembly generally comprises a substantially triangular load arm 2 extending in a direction tangentially of a magnetic disk 4, a magnetic head slider 6 adapted to support a magnetic head (not shown), and an elongated gimbal spring 8 having one end secured to the lower surface of the load arm 2, and the other end secured to the upper surface of the magnetic head slider 6. The load arm 2 includes a flat spring portion 2a, and a rib portion 2b extending from the spring portion 2a and adapted to increase the rigidity of the load arm. The gimbal 8 has a semispherical projection or pivot (not shown), and the load arm 2 has a contact point 2c at its proximal end to contact with the pivot of the gimbal 8. The magnetic head slider 6 is adapted to pitch and roll with movement of the magnetic disk 4 under the influence of the gimbal 8. When the magnetic disk 4 is rotated in a direction as indicated by the arrow A, the magnetic head slider 6 is moved in directions as indicated by the arrow B. As the magnetic disk 4 rotates, air enters between the magnetic disk 4 and the magnetic head slider 6 to form an air spring. To this end, a given load or force is applied from the load arm 2 through the pivot to the magnetic head slider 6 to appropriately float or position the magnetic head slider 6 relative to the magnetic disk 4. In FIG. 10, X and Y indicate circumferential and radial directions of the magnetic disk 4, respectively. Z indicates a direction in which the magnetic head slider 6 is urged toward the magnetic disk 4.

Figure 11A:
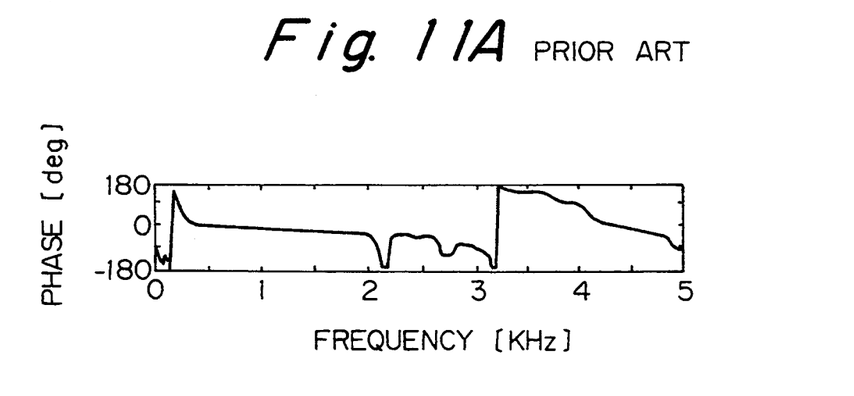
FIG. 11A is a graph showing phase (degree) v.s. frequency (KHz) of drive force produced by a suitable drive means.
Figure 11B:
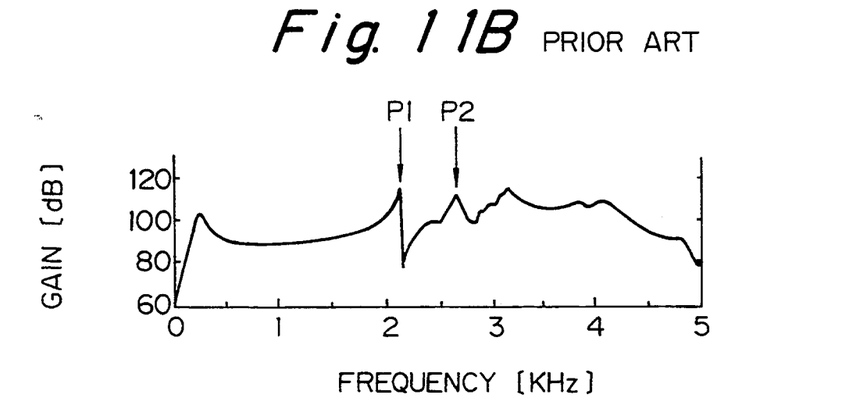
FIG. 11B is a graph showing gain (db) v.s. frequency (KHz)

When the magnetic head slider 6 is accelerated in a direction inwardly of the magnetic disk 4 (the arrow B), the resulting inertial force causes application of a force to the contact point 2c of the load arm 2 in "+Y" direction. This results in deformation of the load arm. As shown in FIG. 11, two resonance peaks P1 and P2 appear at a frequency of less than 5 KHz. At the peak P1 or in a primary mode of vibration, the load arm 2 is twisted in "−θX" direction and bent in "+Y" direction as shown by a solid line in FIG. 12A. As a result, the magnetic head slider 6 is moved in "+Y" direction. At the peak P2 or in a secondary mode of vibration, the load arm 2 is twisted in "−θX" direction and bent in "−Y" direction as shown by a solid line in FIG. 12B. As a result, the magnetic head slider 6 is moved in "−Y" direction.

Figure 13A:
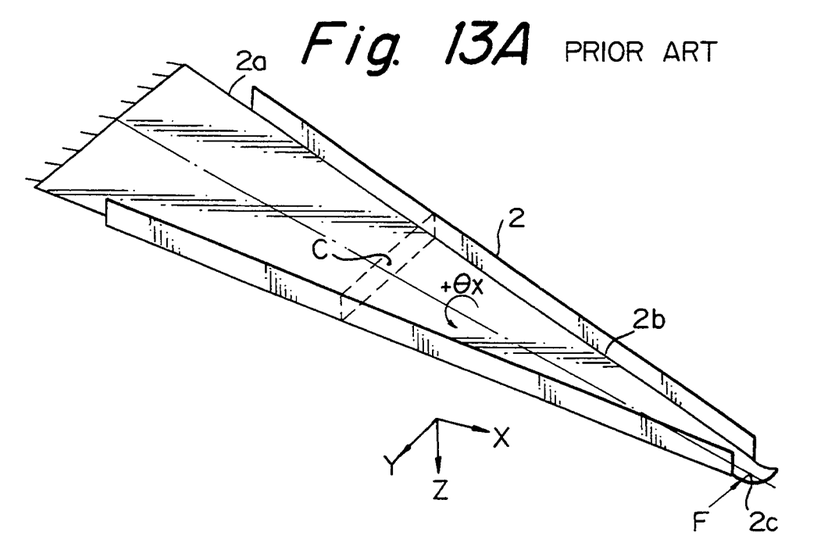
FIG. 13A is a schematic view, in perspective, showing the manner in which the assembly of FIG. 10 is deformed.
Figure 13B:
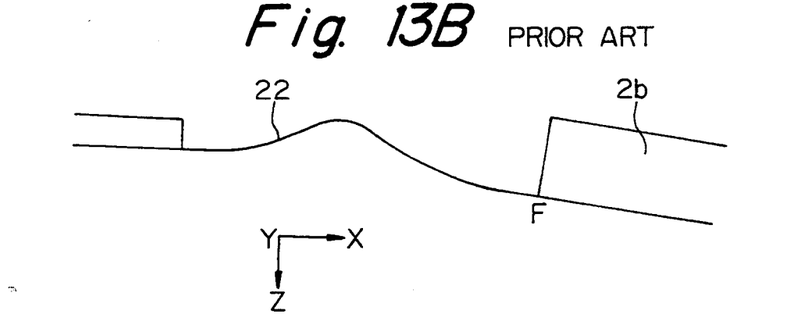
FIG. 13B is a schematic side view of the assembly shown in FIG. 13A.
Figure 13C:
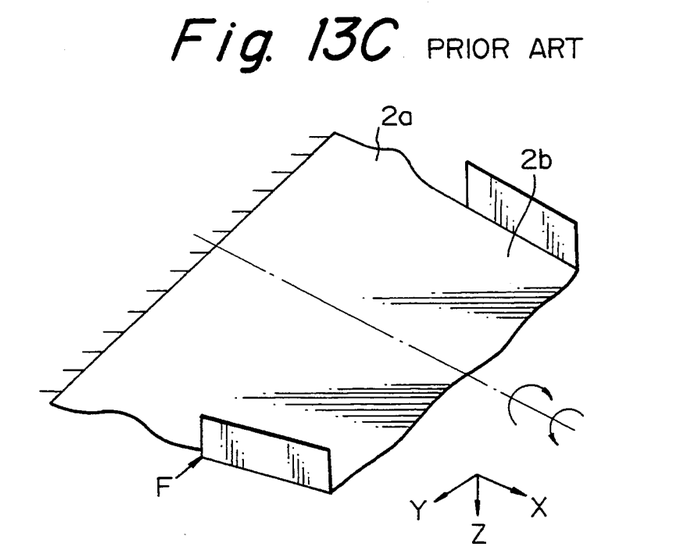
FIG. 13C is a fragmentary view of a load arm shown in FIG. 13A.
Figure 14:
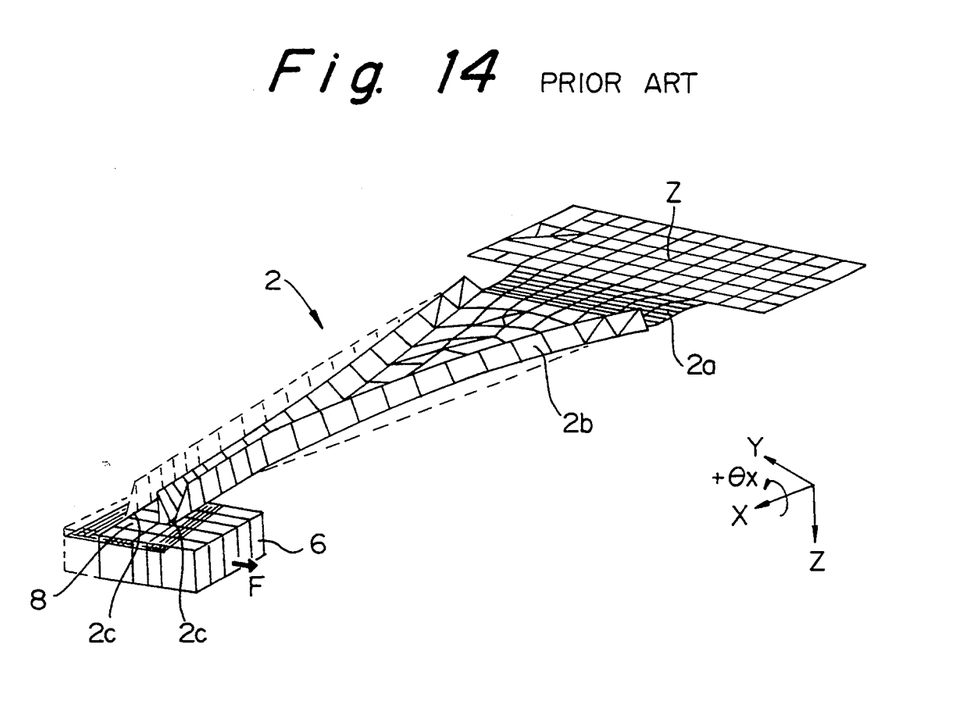
FIG. 14 is a view showing the manner in which the prior art assembly is deformed when a force is applied to the tip of the load arm.

In such a conventional magnetic head support assembly, the rib portion 2b of the load arm 2 has a shear center C (Z<0) above the nominal plane (Z=0) of the load arm throughout its length. If a force F is applied to the contact point 2c, then the load arm 2 is always deformed or twisted in "+θX" direction as shown in FIG. 13A. Also, the spring portion 2a of the load arm is deformed in a manner as shown in FIG. 13B. Referring to FIG. 13C, if a force F is applied to a boundary between the spring portion 2a and the rib portion 2b, the load arm may be deformed in either "+θX" direction or "−θX" direction depending on conditions. However, while the spring portion 2b is bent to exert a load, for example, if 9.5 gf on the magnetic head slider 6, of a force is applied to the contact point 2c of the load arm 2 in "−Y" direction, then the load arm is deformd in "+θX" direction as shown in FIG. 14.

Figure 12A:
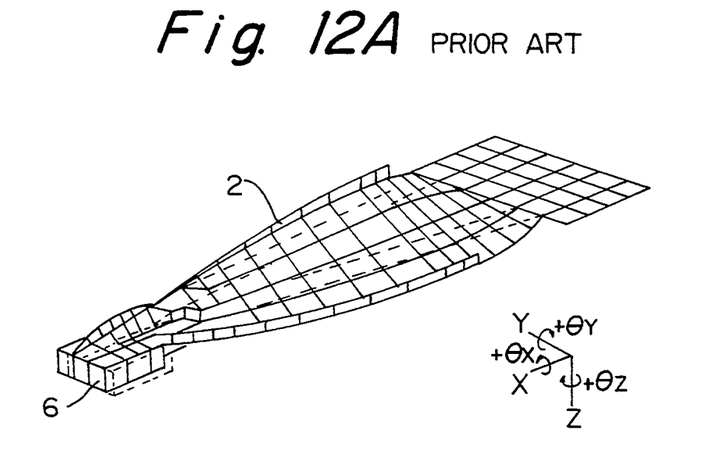
FIGS. 12A and 12b illustrate deformation of the prior art assembly shown in FIG. 10.
Figure 12B:
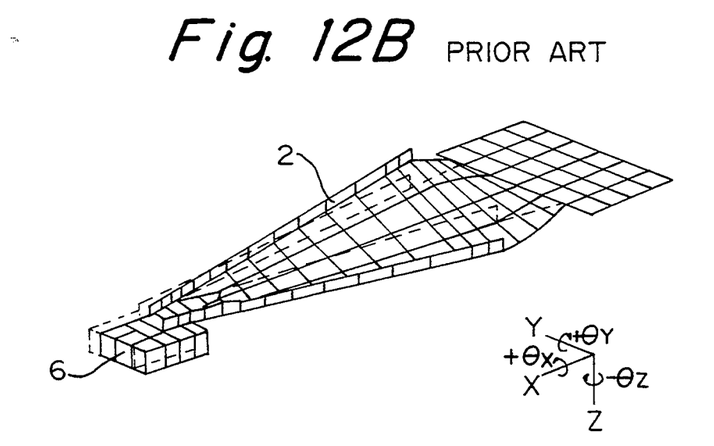

The flat load arm 2 has high rigidity in a direction in which it is bent, but has low rigidity in which it is twisted. When the load arm 2 is twisted and bent in a dynamic mode of vibration as shown in FIGS. 12A and 12B, resonance peaks appear at a relatively low frequency as shown in FIG. 11. This deteriorates positioning of the magnetic head slider relative to the magnetic disk.

SUMMARY OF THE INVENTION

It is an object of the present invention to provide a magnetic head support assembly which prevents undesirable displacement of a magnetic head slider so as to more accurately position the magnetic head sldier relative to a magnetic disk.

Another object of the present invention is to provide a magnetic head support assembly which has high rigidity in a direction in which the support assembly is positioned, and is free of resonance peaks until the frequency of drive force becomes high.

According to one aspect of the present invention, there is provided an assembly for supporting a magnetic head to float relative to a magnetic disk which comprises a load arm extending substantially tangentially of a magnetic disk and moved substantially radially of the magnetic disk, the load arm having a proximal end, and a distal end and including a spring portion at its proximal end, gimbal means secured to the distal end of the load arm and including a pivot, the load arm including a contact point at its distal end to contact with the pivot, and a magnetic head slider secured to gimbal means so as to pitch and roll about the pivot with movement of the magnetic disk, the magnetic head slider being adapted to support a magnetic head and urged toward the magnetic disk by the spring portion of the load arm. The load arm has a shear center at the contact point. When the magnetic head slider is moved substantially radially of the magnetic disk, inertial vector of the magnetic head slider is applied to the contact point of the load arm. The load arm has a central shear plane in which the inertial vector is included.

According to another aspect of the present invention, there is provided an assembly for supporting a magnetic head to float relative to a magnetic disk which comprises a load arm extending substantially tangentially of a magnetic disk and moved substantially radially of the magnetic disk, the load arm having a proximal end, and a distal end and including a spring portion at its proximal end, gimbal means secured to the distal end of the load arm and including a pivot, the load arm including a contact point at its distal end to contact with the pivot, and a magnetic head slider secured to gimbal means so as to pitch and roll about the pivot with movement of the magnetic disk, the magnetic head slider being adapted to support a magnetic head and urged toward the magnetic disk by the spring portion of the load arm. The load arm includes a portion extending from the spring portion, and this portion and the spring portion have a common central shear plane in which the contact point of the load arm is included.

BRIEF DESCRIPTION OF THE DRAWINGS

For a better understanding of the present invention, reference may be made to the following description of preferred embodiments when taken in conjunction with the accompanying drawings, in which.

DESCRIPTION OF THE PREFERRED EMBODIMENTS

Like reference numerals indicate like or corresponding components or parts throughout several views of the drawing.

Figure 1A:
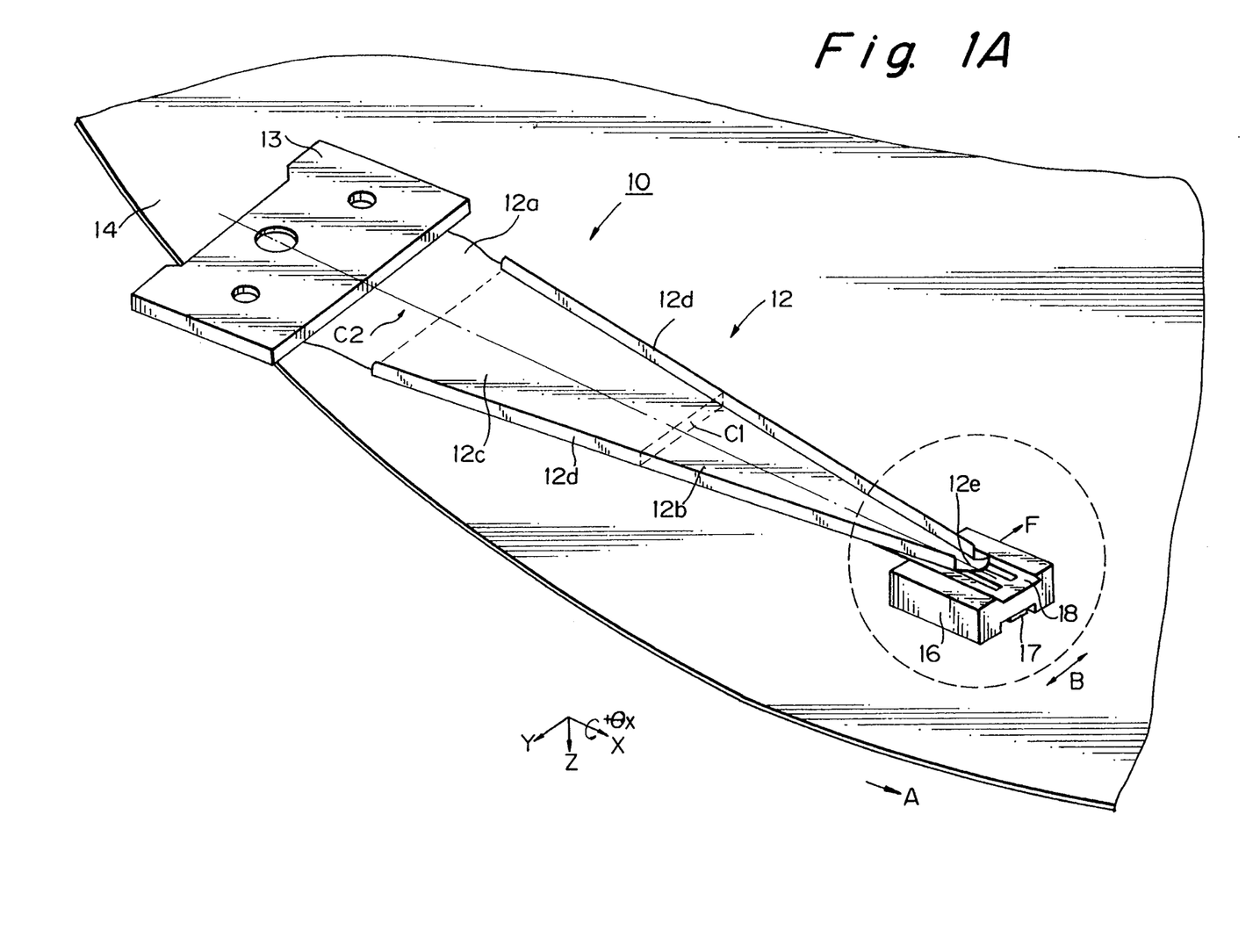
FIG. 1A is a perspective view of a magnetic head support assembly according to a first embodiment of the present invention.
Figure 1B:
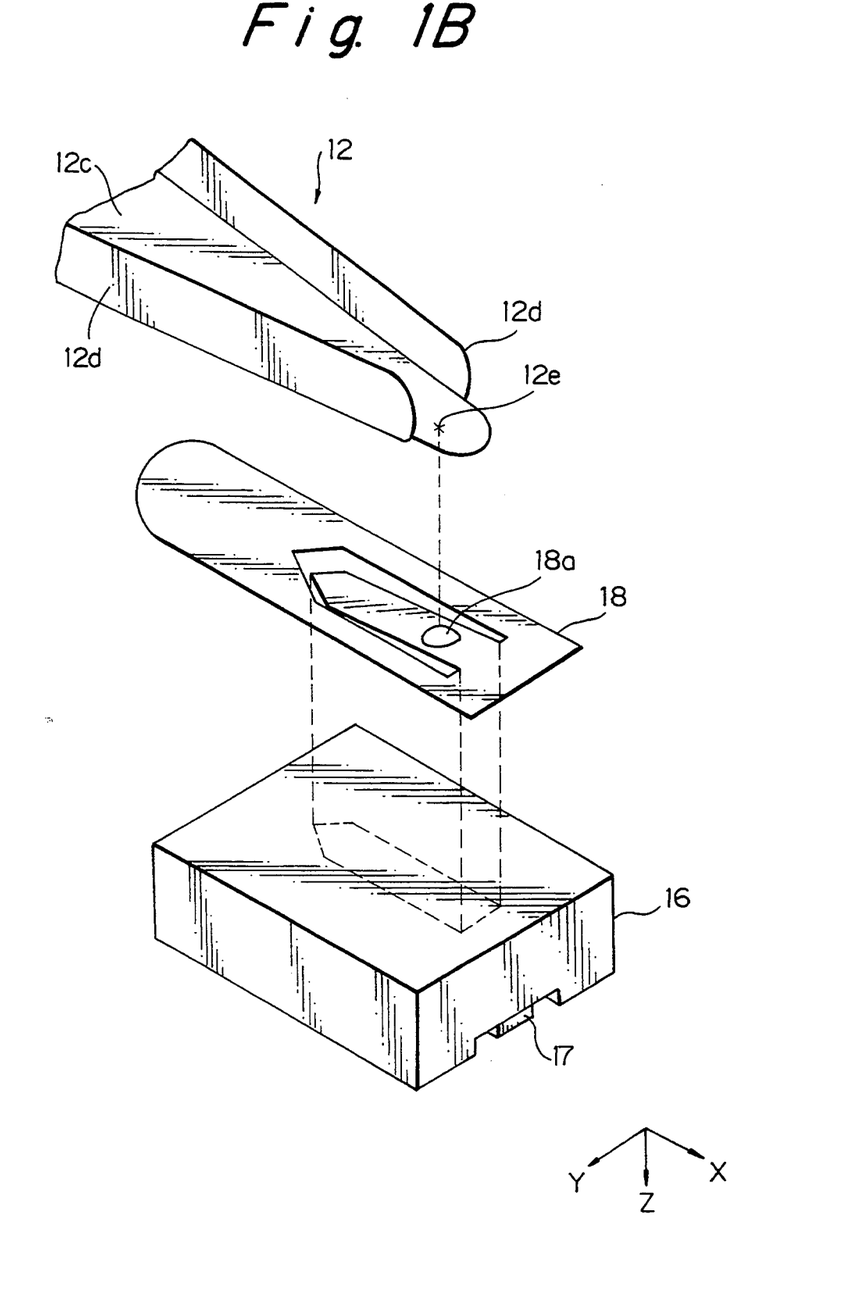
FIG. 1B is an exploded view of a portion of the assembly as encircled in FIG. 1A.

Referring now to FIGS. 1A and 1B, there is illustrated a magnetic head support assembly made according to a first embodiment of the present invention and generally indicated as at 10. The support assembly 10 generally comprises a load beam or arm 12 mounted to a mount base 13 (only partially shown and connected to a suitable drive means) extending in a direction substantially tangentially of a magnetic disk 14, a magnetic head slider 16 adapted to support a magnetic head 17, and an elongated gimbal spring 18 having one end welded or otherwise secured to the lower surface of the load arm 12, and the other end bonded or otherwise secured to the upper surface of the magnetic head slider 16. The load arm 12 generally includes a spring portion 12a at its proximal end, and a rib portion 12b extending from the spring portion 12a and having substantially flat plate 12c and a pair of ribs 12d extending upwardly from opposite sides of the flat plate 12c. The gimbal 18 has a semispherical projection or pivot 18a, and the load arm 12 has a contact point 12e at its distal end to contact with the pivot 18a of the gimbal 18. Under the influence of the gimbal 18, the magnetic head slider 16 is adapted to pitch and roll about the pivot 18a with movement of the magnetic disk 14. When the magnetic disk 14 is rotated in a direction as indicated by the arrow A in FIG. 1A, the magnetic head slider 16 is moved in directions as indicated by the arrow B. At this time, air enters between the magnetic disk 14 and the magnetic head slider 16 to form an air spring. To this end, a given load or force is applied from the load arm 12 through the pivot 18a to the magnetic head slider 16 to appropriately float or position the magnetic head slider 16 relative to the magnetic disk 14.

Figure 3:
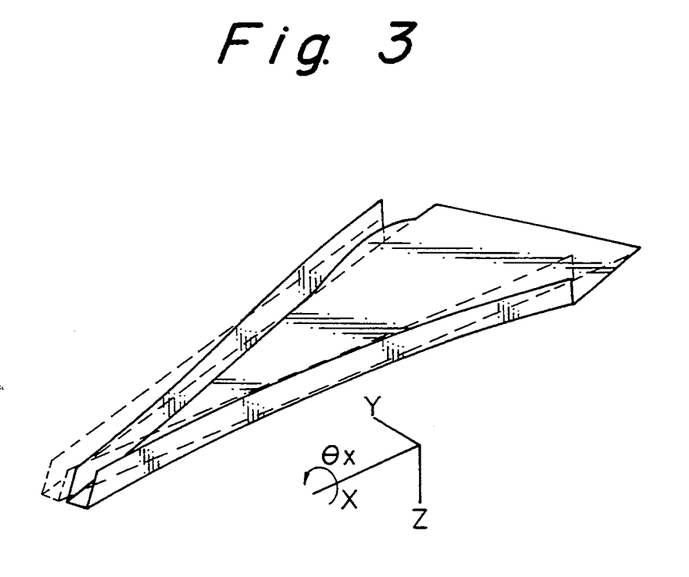
FIG. 3 is a perspective view of a load arm, a broken line illustrating deformation of the load arm.

Normally, a beam structure such as a load arm is bent and twisted upon application of a force (see FIG. 3). However, there are a certain point and directions in which the beam structure is bent, but not twisted. Such point and directions exist in any vertical plane which extends across the beam structure and are referred to as "a shear center", and "main shear axes", respectively. These main shear axes pass the shear center and extend at right angles to one another. The term "central shear axis" is used herein to mean an axis extending between a shear center in one such vertical plane and a shear center in another vertical plane. Also, the term "central shear plane" is used to mean a plane formed by a central shear axis and a main shear axis.

In the illustrated embodiment, the rib portion of the load arm 12 has a shear center C1. This shear center C1 ($Z<0$) is located above the nominal plane ($Z=0$) of the load arm 12. The spring portion 12a is shaped such that a shear center C2 ($Z>0$) is below the nominal plane of the load arm 12. This allows the load arm 12 to have a shear center at the contact point 12e. A force F is applied to the load arm in a direction substantialy parallel to the magnetic disk 14. The support assembly is laterally symmetrical. Under the circumstances, the load arm 12 has a central shear plane extending in parallel to the magnetic disk 14. Inertial vector to be applied to the contact point 12e thus passes the shear center and is included in the central shear plane of the load arm 12. With this arrangement, the load arm 12 may be twisted at a boundary between the spring portion 12a and the rib portion 12b, but not at the contact point 12e. When the magnetic head slider 16 is moved or accelerated, the resultant inertial force causes application of a force only in a direction to bend the tip or distal end of the load arm 12.

Figure 2A:
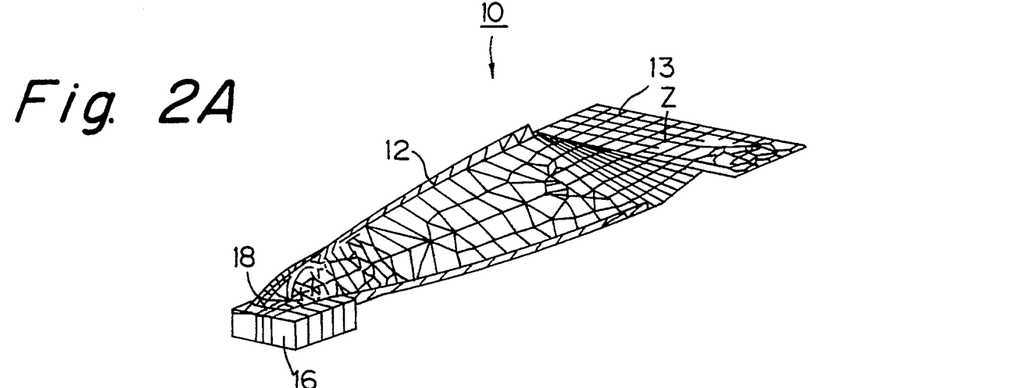
FIGS. 2A and 2B illustrate deformation of the magnetic head support assembly shown in FIG. 1.
Figure 2B:
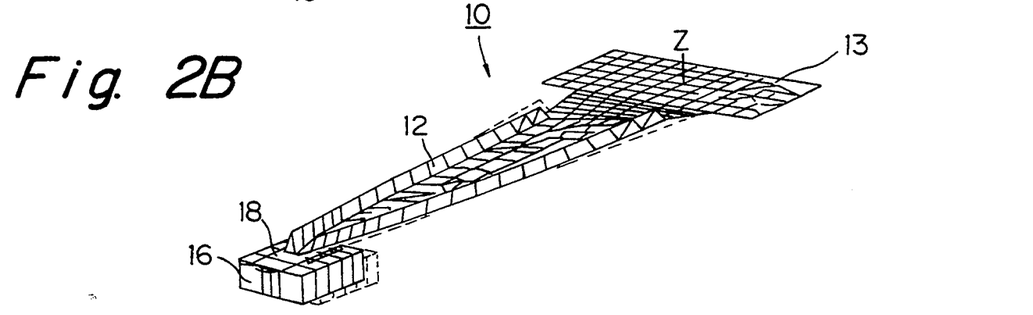
Figure 2C:
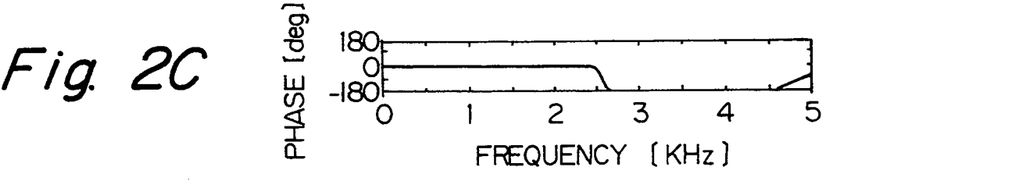
FIG. 2C is a graph showing phase (degree) v.s. frequency (KHz) of drive force produced by a suitable drive means.
Figure 2D:
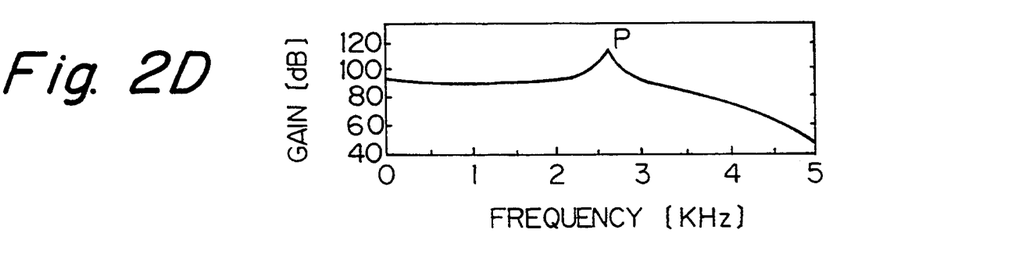
FIG. 2D is a graph showing Gain (db) v.s. frequency (KHz)

FIG. 2A illustrates a primary mode of vibration or a torsion mode where the load arm 12 is twisted, but the magnetic head slider 16 is not deformed in a direction in which it is positioned. FIG. 2B illustrates a secondary mode of vibration or lateral bending mode where the load arm 12 is twisted at a boundary between the spring portion 12a and the rib portion 12b, but not at the contact point 12e. As shown in FIGS. 2C and 2D, a resonance peak P (FIG. 2D) appears only in the secondary mode of vibration. This arrangement provides for more accurate positioning of the magnetic head slider 16 and thus, the magnetic head 17.

Figures 4A, 4B:
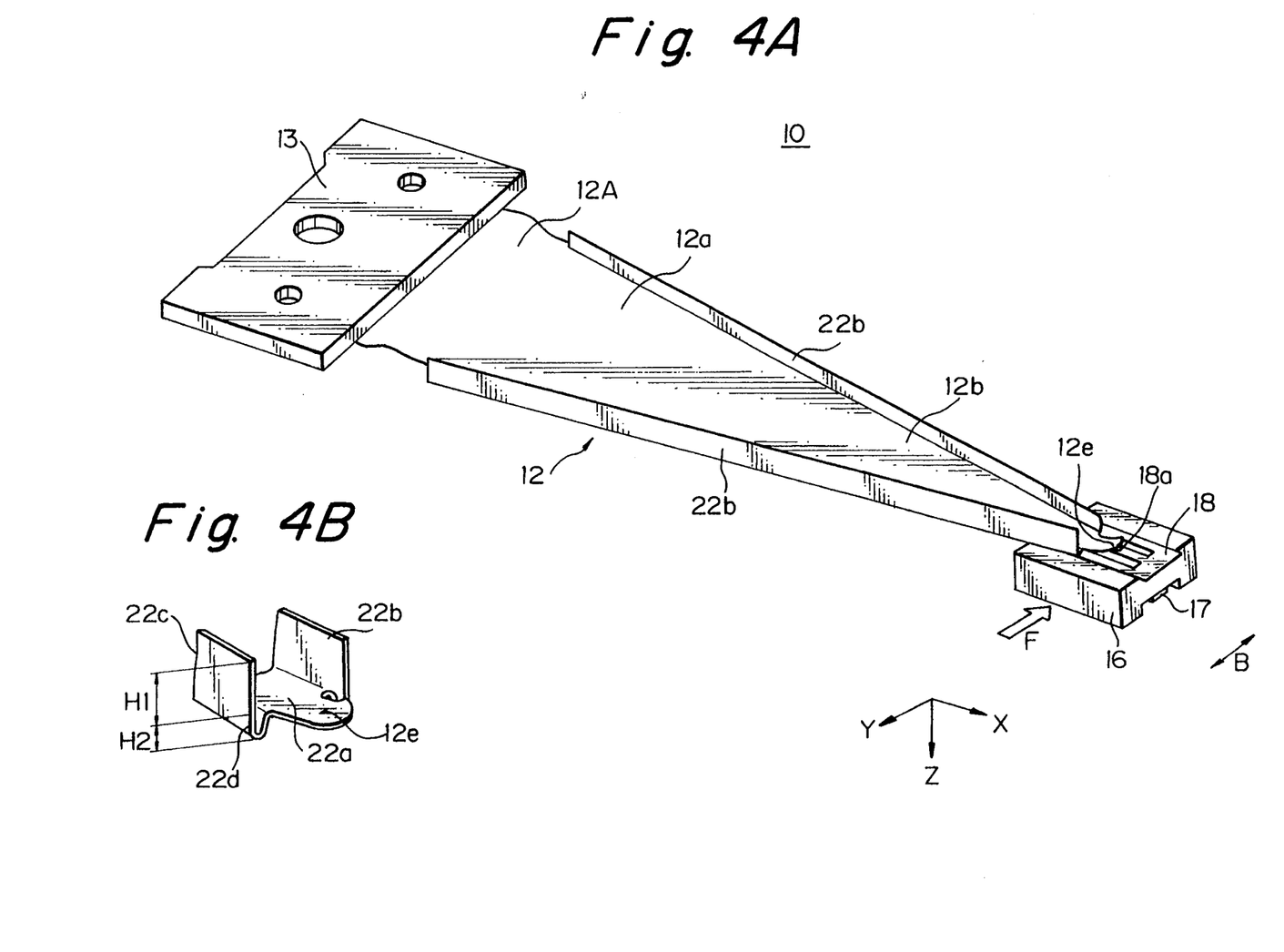
FIG. 4A is a perspective view of a magnetic head support assembly according to a second embodiment of the present invention.
FIG. 4B is a fragmentary view showing the distal end of a load arm.

Referring to FIG. 4A and 4B, there is illustrated a magnetic head support assembly according to a second embodiment of the present invention. The spring portion 12a of the load arm 12 is substantially flat when force is applied to the magnetic head slider 16. The rib portion 12b of the load arm 12 has a substantially flat plate 22a, and a pair of ribs 22b extending from opposite sides of the flat plate 22a and having a substantially J-shaped section. In FIG. 4B, the reference character H1 indicates the height of a portion 22c of each rib 22b above the nominal plane of the rib portion 12 or the flat plate 22a. The reference character H2 indicates the height of a portion 22d of the rib 22b below the flat plate 22a. The heights H1 and H2 are determined such that the moment of inertia of area of the portion 22c of the rib 22b is substantially equal to that of the portion 22d of the rib 22b in the vertical direction ("Z" direction in FIG. 4A) of the magnetic disk 14. This arrangement allows the load arm 12 to have a shear center at the contact point 12e without substantially changing the design of a conventional assembly.

Figure 5:
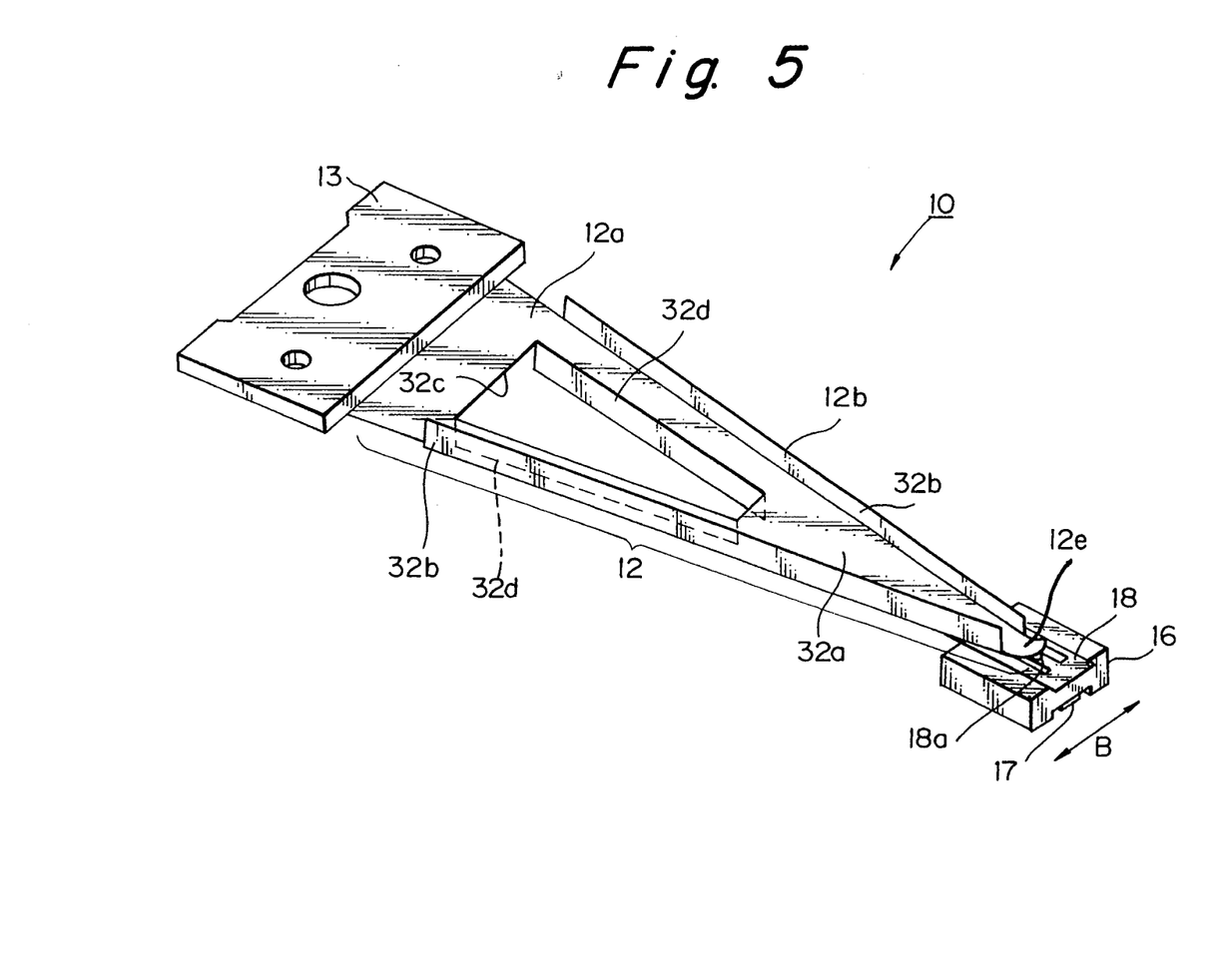
FIG. 5 is a perspective view of a magnetic head support assembly according to a third embodiment of the present invention.

Referring to FIG. 5, there is illustrated a third embodiment of the present invention. The rib portion 12b of the load arm 12 has a substantially flat plate 32a, and a pair of first ribs 32b extending upwardly from opposite sides of the flat plate 32a. The flat plate 32a has an opening 32c. A pair of second ribs 32d extend downwardly from longitudinal edges of the opening 32c. This arrangement also allows the load arm 12 to have a shear center at the contact point 12e as in the previous embodiments.

Figure 6:
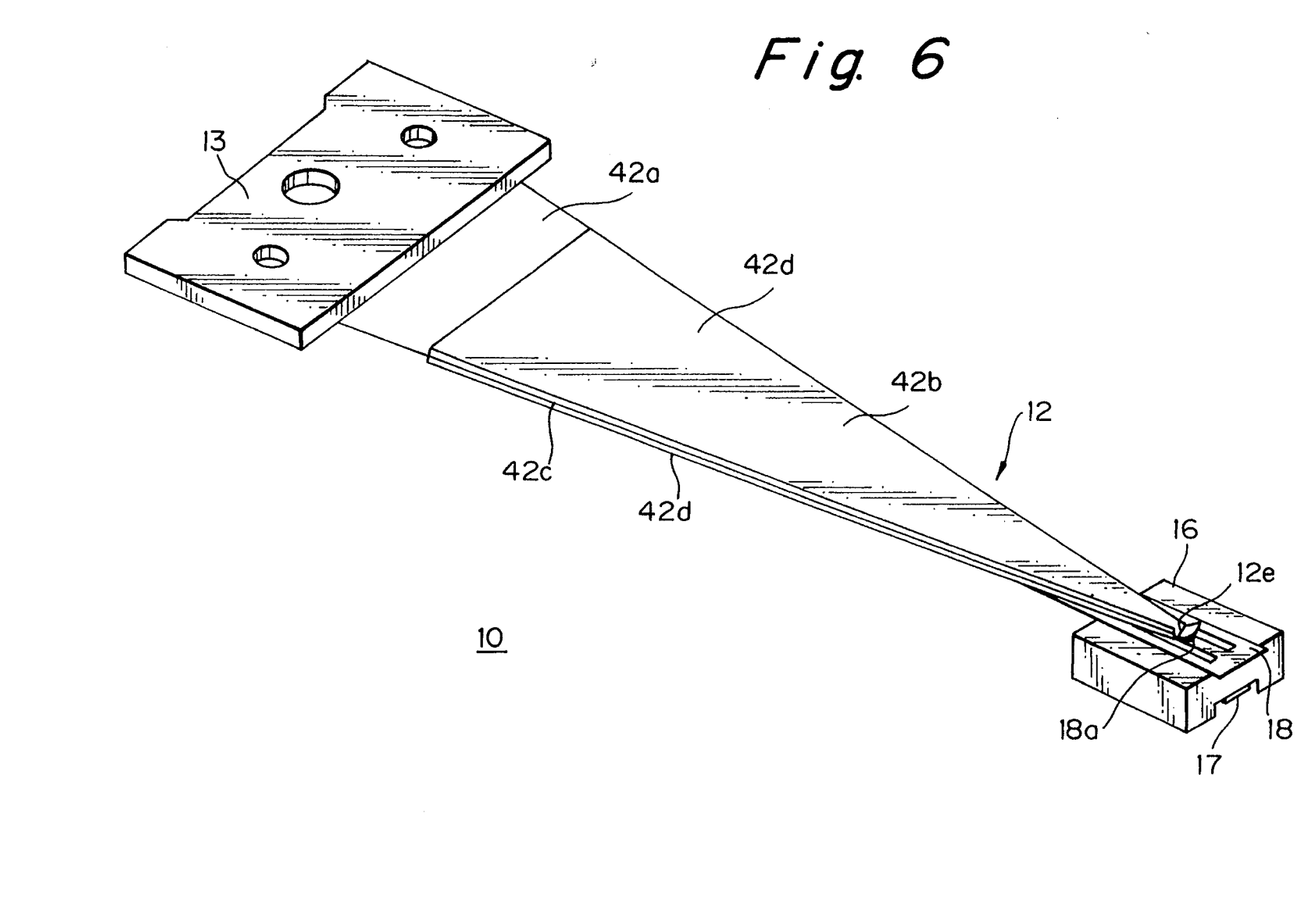
FIG. 6 is a perspective view of a magnetic head support assembly according to a fourth embodiment of the prsent invention.

Referring to FIG. 6, there is illustrated a magnetic head support assembly according to a fourth embodiment of the present invention. The load arm 12 is generally triangular as viewed in plan and includes a substantially flat spring portion 42a, and a reinforced portion 42b. The spring portion 42a is so shaped as to be substantially flat when it is mounted to the mount base 13 so as to urge the magnetic head slidier 16 toward the magnetic disk 14. The reinforced portion 42b is vertically symmetrical and includes a center plate 42c extending unitarily from the spring portion 42a, and a pair of plates 42d, 42d attached to the upper and lower surfaces of the center plate 42c. By this arrangement, the spring portion 42a and the reinforced portion 42b of the load arm 12 have a common central shear plane. Thus, the load arm 12 has a shear center at the contact point 12e, and the direction of an inertial force is included in the central shear plane of the load arm 12.

Figure 7A:
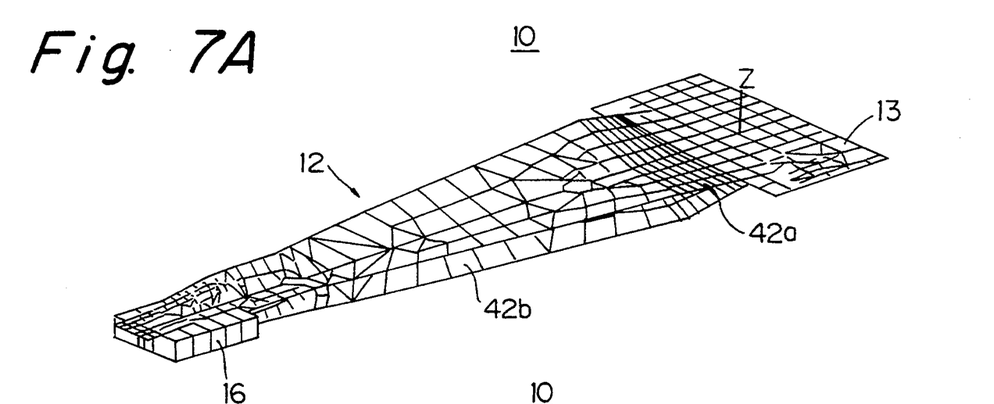
FIGS. 7A and 7B illustrate deformation of the magentic head support assembly shown in FIG. 6.
Figure 7B:
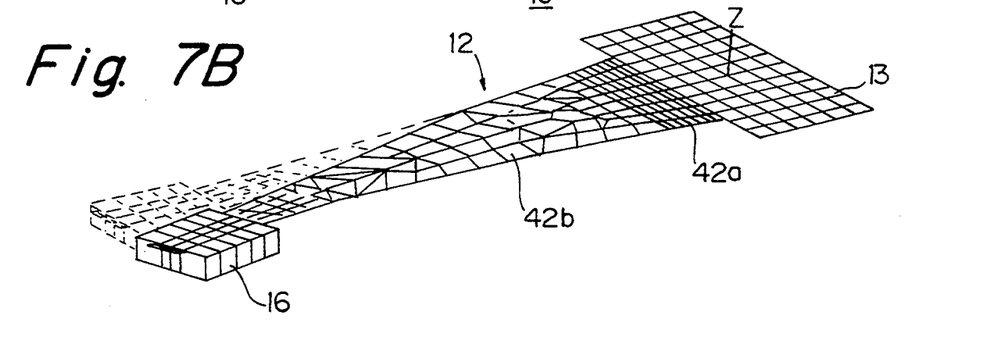
Figure 7C:
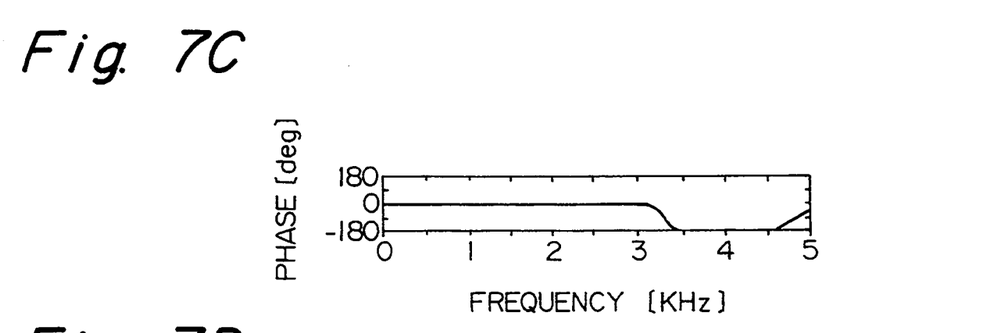
FIG. 7C is a graph showing phase (degree) v.s. frequency (KHz) of drive force produced by a suitable drive means.
Figure 7D:
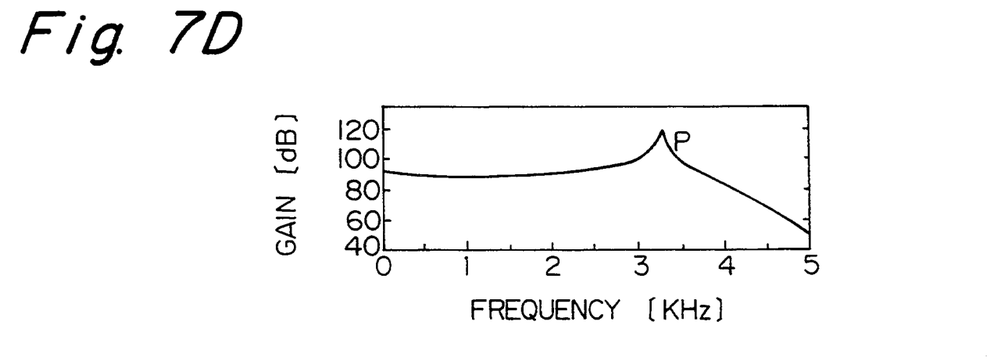
FIG. 7D is a graph showing gain (db) v.s. frequency (KHz)

In a primary mode of vibration, the load arm 12 is twisted as shown in FIG. 7A. In a secondary mode of vibration, the load arm 12 is laterally bent as shown in FIG. 7B. Since the load arm 12 has a high rigidity in the direction in which it is laterally bent, a resonance peak P appears at a relatively high frequency as shown in FIG. 7D, approximately 1 KHz higher than the previous embodiments.

As an alternative, the plates 42d, 42d may have openings to form a ring or a C-shaped element. Also, two or more plates may be attached to the upper and lower surfaces of the center plate 42c.

Figure 8:
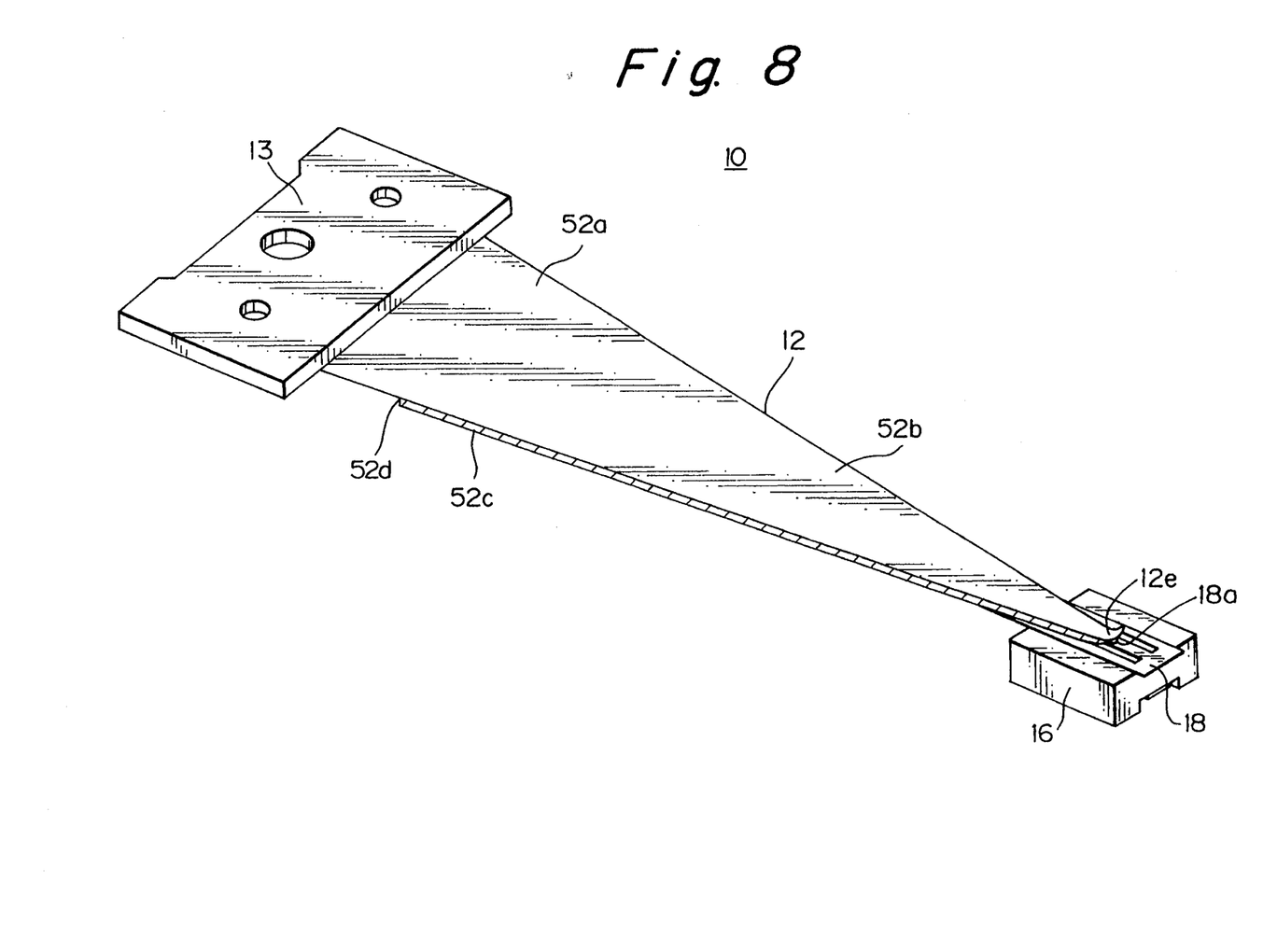
FIG. 8 is a perspective view of a magnetic head support assembly according to a fifth embodiment of the present invention.

FIG. 8 illustrates a magnetic head support assembly according to a fifth embodiment of the present invention. The load arm 12 is generally triangular in shape and includes a substantially flat spring portion 52a at its proximal end, and a portion 52b extending from the spring portion 52a. A plate 52c is attached to the lower surafce of the portion 52b of the load arm 12 by an adhesive 52d. Advantageously, this adhesive 52d acts as a damper. By this arrangement, a resonance peak appears at a higher frequency. This arrangement has a reduced peak gain, as compared to an arrangement wherein the plate 52c is welded to the portion 52b.

Figure 9:
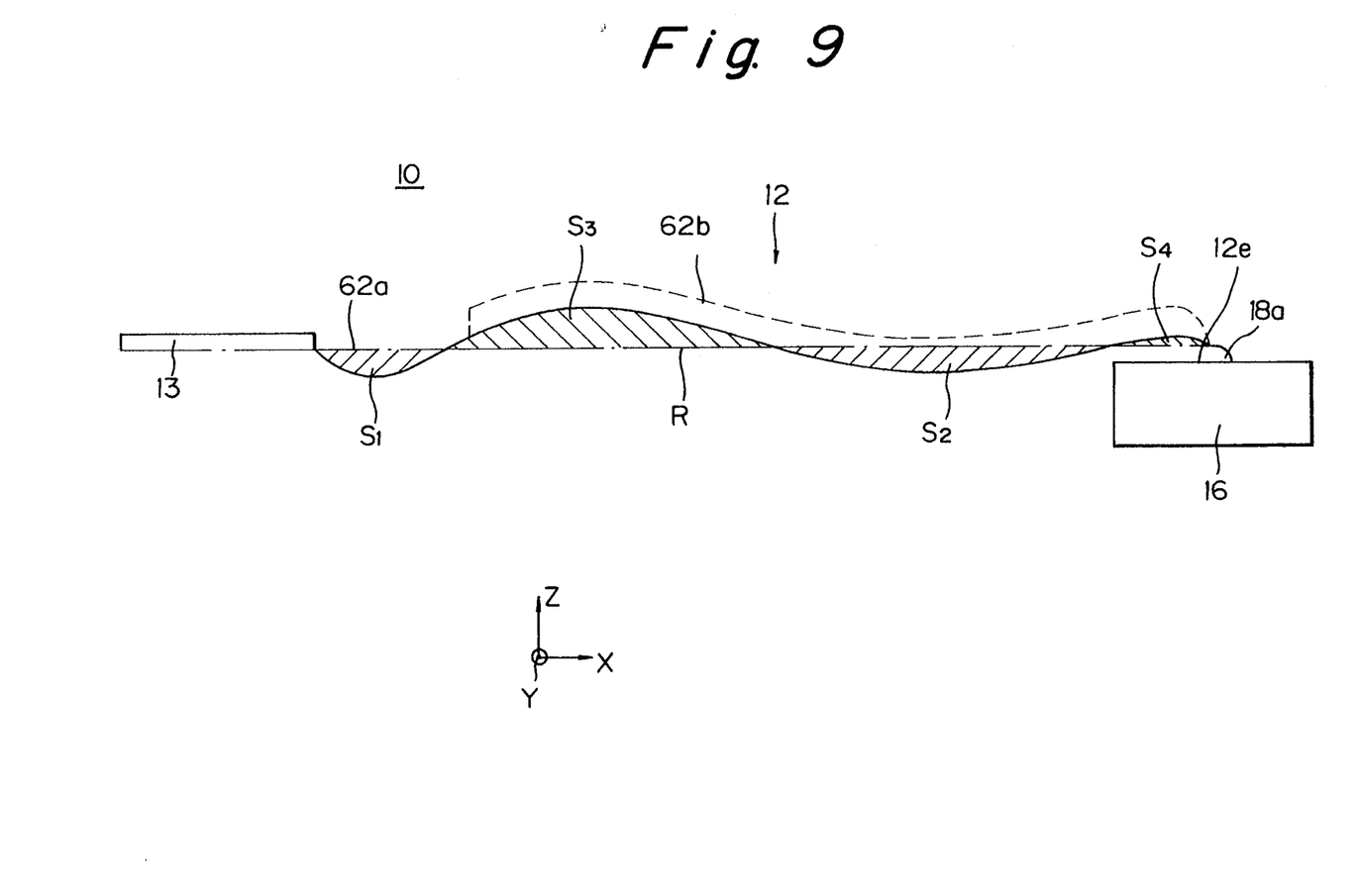
FIG. 9 is a longitudinal sectional view of a magnetic head support assembly according to a sixth embodiment of the present invention.

FIG. 9 is a vertical sectional view of a sixth embodiment of a magnetic head support assembly taken on the center line of the load arm 12. The load arm 12 includes a wavy spring portion 62a at its proximal end, and a wavy rib portion 62b extending from the spring portion 62a. In the illustrated embodiment, the load arm is laterally symmetrical. The load arm 12 has sectional areas S1 and S2 located below the nominal plane R of the load arm 12, and sectional areas S3 and S4 above the nominal plane R of the load arm 12. The total area of the sectional areas S1 and S2 is substantially the same as that of the sectional areas S3 and S4. This enables the load arm 12 to have a shear center at the contact point 12e. In this embodiment, the load arm has a pair of ribs. Alternatively, the load arm 12 may have a pair of plates on opposite sides of the center plate as shown in FIG. 6. This arrangement is useful in the case that the spring portion and the rib portion of the load arm can not be flat.

While there have been shown and described what are at present considered the preferred embodiments of the invention, it will be obvious to those skilled in the art that various changes and modifications may be made therein without departing from the scope of the invention as defined by the appended claims.

What is claimed is:

1. An assembly for supporting a magnetic head to float relative to a magnetic disk, comprising:
   a load arm extending substantially tangentially of a magnetic disk and moved substantially radially of the magnetic disk, said load arm having a proximal end, and a distal end and including a spring portion at its proximal end;
   gimbal means secured to the distal end of said load arm and including a pivot, said load arm including a contact point at its distal end to contact with said pivot; and
   a magnetic head slider secured to said gimbal means and adapted to support a magnetic head, said magnetic head slider being urged toward the magnetic disk by said spring portion of said load arm, and said gimbal means allowing said magnetic head slider to pitch and roll about said pivot with movement of said magnetic disk;

said load arm having a shear center at said contact point.

2. The assembly of claim 1, wherein when said magnetic head slider is moved substantially radially of the magnetic disk, inertial vector of said magnetic head slider is applied to the contact point of said load arm, said load arm having a central shear plane in which said inertial vector is included.

3. The assembly of claim 1, wherein said load arm has a nominal horizontal plane and is laterally symmetrical, and wherein said load arm has a first sectional area to one side of the nominal plane and bounded by the nominal plane and the upper surface of the load arm, and a second sectional area to another side of the nominal plane and bounded by the nominal plane and the lower surface of the load arm, said first sectional area being substantially equal to said second sectional area.

4. The assembly of claim 1, wherein said load arm includes a substantially flat plate extending from said spring portion to said pivot, said plate having a first pair of facing ribs extending from lateral sides of said plate in a first direction, longitudinal edges within the perimeter of said plate defining an opening, and additional ribs extending in a second direction from said longitudinal edges parallel and opposite said first direction.

5. The assembly of claim 1, wherein said load arm comprises at least three plates forming a reinforced portion so that said reinforced portion and said spring portion have a common central shear plane.

6. The assembly of claim 1, wherein said load arm includes a plate secured to said load arm by an adhesive which dampens vibrations on said assembly.

7. The assembly of claim 1, including a nominal plane defined by a mount base and said pivot, wherein said load arm including said spring portion has a sinusoidal cross-section along said nominal plane from said mount base to said pivot wherein said sinusoidal cross-section defines areas between the nominal plan and the upper and lower surface of the load arm along a vertical plane.

8. An assembly for supporting a magnetic head to float relative to a magnetic disk, comprising:

a load arm extending substantially tangentially of a magnetic disk and moved substantially radially of the magnetic disk, said load arm having a proximal end, and a distal end and including a spring portion at its proximal end;

gimbal means secured to the distal end of said load arm and including a pivot, said load arm including a contact point at its distal end to contact with said pivot; and a magnetic head slider secured to said gimbal means and adapted to support a magnetic head, said magnetic head slider being urged toward the magnetic disk by said spring portion of said load arm, and said gimbal means allowing said magnetic head slider to pitch and roll about said pivot with movement of said magnetic disk;

said spring portion of said load arm being substantially flat when a force is applied from the spring portion through said pivot to the magnetic head slider, said load arm including a portion extending from said spring portion, said portion and said spring portion having a common central shear plane in which said contact point of said load arm is included.

9. The assembly of claim 8, wherein said load arm includes an elongated rib portion extending from said spring portion and having a substantially flat plate, and a pair of ribs extending from lateral sides of said flat plate and having a substantially J-shaped section, and wherein each of said ribs includes a first portion located above said flat plate and having a first height, and a second portion located below said flat plate and having a second height, said first height and said second height being determined such that moment of inertia of area of said first portion of each rib is substantially equal to that of said second portion.

* * * * *